(12) United States Patent
Zhai et al.

(10) Patent No.: US 9,665,246 B2
(45) Date of Patent: *May 30, 2017

(54) CONSISTENT TEXT SUGGESTION OUTPUT

(71) Applicant: Google Inc., Mountain View, CA (US)

(72) Inventors: Shumin Zhai, Los Altos, CA (US); Philip Quinn, Christchurch (NZ)

(73) Assignee: Google Inc., Mountain View, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/144,991

(22) Filed: Dec. 31, 2013

(65) Prior Publication Data

US 2014/0310639 A1 Oct. 16, 2014

Related U.S. Application Data

(60) Provisional application No. 61/812,521, filed on Apr. 16, 2013.

(51) Int. Cl.
   *G06F 3/048* (2013.01)
   *G06F 3/0484* (2013.01)
   (Continued)

(52) U.S. Cl.
   CPC .......... *G06F 3/0484* (2013.01); *G06F 3/0237* (2013.01); *G06F 3/04886* (2013.01);
   (Continued)

(58) Field of Classification Search
   USPC ................................................ 715/773, 780
   See application file for complete search history.

(56) References Cited

U.S. PATENT DOCUMENTS 6,111,985 A    8/2000   Hullender et al.
6,286,064 B1   9/2001   King et al.
(Continued)

FOREIGN PATENT DOCUMENTS

EP    1923796 A1    5/2008
EP    2109046 A1   10/2009
(Continued)

OTHER PUBLICATIONS

Andrew Trotman et al., Focused Retrieval and Result Aggregation, Jun. 11, 2010, Springer Science and Business Media, pp. 408-411.*
(Continued)

*Primary Examiner* — Tam Tran
(74) *Attorney, Agent, or Firm* — Shumaker & Sieffert, P.A.

(57) ABSTRACT

In one example, a method includes outputting, by a computing device and for display, a graphical user interface including a plurality of text suggestion regions. The method further includes receiving, by the computing device, an indication of gesture input detected at a presence-sensitive input device, and selecting, based at least in part on the indication of the gesture input, a candidate character string from a plurality of candidate character strings. The method further includes determining that the candidate character string was previously selected while being displayed within a particular text suggestion region from the plurality of text suggestion regions, and outputting, for display and based at least in part on determining that the candidate character string was previously selected while being displayed within the particular text suggestion region, the candidate character string within the particular text suggestion region.

13 Claims, 5 Drawing Sheets

(51) Int. Cl.
*G06F 3/023* (2006.01)
*G06F 3/0488* (2013.01)
*G06F 17/27* (2006.01)
*G06F 3/01* (2006.01)

(52) U.S. Cl.
CPC ............ *G06F 17/27* (2013.01); *G06F 17/276* (2013.01); *G06F 3/017* (2013.01)

(56) References Cited

U.S. PATENT DOCUMENTS

| | | |
|---|---|---|
| 6,292,179 B1 | 9/2001 | Lee |
| 6,801,190 B1 | 10/2004 | Robinson et al. |
| 7,030,863 B2 | 4/2006 | Longe et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,453,439 B1 | 11/2008 | Kushler et al. |
| 7,508,324 B2 | 3/2009 | Suraqui |
| 7,706,616 B2 | 4/2010 | Kristensson et al. |
| 7,716,579 B2 | 5/2010 | Gunn et al. |
| 7,750,891 B2 | 7/2010 | Stephanick et al. |
| 7,921,361 B2 | 4/2011 | Gunn et al. |
| 8,036,878 B2 | 10/2011 | Assadollahi |
| 8,117,540 B2 | 2/2012 | Assadollahi |
| 8,135,582 B2 | 3/2012 | Suraqui |
| 8,825,474 B1 | 9/2014 | Zhai et al. |
| 2004/0183833 A1* | 9/2004 | Chua .................... G06F 3/0237 715/773 |
| 2005/0210402 A1* | 9/2005 | Gunn .................... G06F 3/0236 715/773 |
| 2006/0119582 A1 | 6/2006 | Ng et al. |
| 2006/0176283 A1 | 8/2006 | Suraqui |
| 2007/0074131 A1 | 3/2007 | Assadollahi |
| 2008/0316183 A1 | 12/2008 | Westerman et al. |
| 2009/0077464 A1 | 3/2009 | Goldsmith et al. |
| 2009/0109067 A1 | 4/2009 | Burstrom |
| 2009/0187846 A1 | 7/2009 | Paasovaara |
| 2009/0192786 A1 | 7/2009 | Assadollahi |
| 2010/0036655 A1 | 2/2010 | Cecil et al. |
| 2010/0131447 A1 | 5/2010 | Creutz et al. |
| 2010/0265181 A1 | 10/2010 | Shore |
| 2012/0036469 A1 | 2/2012 | Suraqui |
| 2013/0021286 A1 | 1/2013 | Sudo |
| 2013/0046544 A1* | 2/2013 | Kay .................... G06F 3/04883 704/275 |
| 2014/0063067 A1* | 3/2014 | Compton .............. G06F 3/0237 345/660 |
| 2014/0267056 A1* | 9/2014 | Pasquero .............. G06F 3/0237 345/169 |

FOREIGN PATENT DOCUMENTS

| | | |
|---|---|---|
| JP | 2011221759 A | 11/2011 |
| JP | 2012248153 A | 12/2012 |

OTHER PUBLICATIONS

Dr. Ido Dagan, Automation of Information Access Tasks: Technological Trends and Opportunities, May 1998, ABI/Inform Professional Advanced, p. 75-78.*
"Using the Word Prediction in Accent," retrieved from http://www.prentrom.com/support/article/1726, accessed on Oct. 24, 2012, 10 pp.
"Setting the Selection Area in Word Prediction," retrieved from http://talknow.prentrom.com/support/articles?id=1365, accessed on Oct. 24, 2012, 2 pp.
"Adjusting the Settings for Word Prediction," retrieved from http://talknow.prentrom.com/support/articles?id=1342, accessed on Oct. 24, 2012, 10 pp.
Lomas, "Hey Apple, What the NExt iPhone Really, Really Needs Is a Much Better Keyboard," retrieved from techcrunch.com/2013/04/21/the-iphone-keyboard-stinks/?, accessed on Apr. 22, 2013, 6 pp.
U.S. Appl. No. 60/430,338, by Daniel Suraqui, filed Nov. 29, 2002.
U.S. Appl. No. 60/505,724, by Daniel Suraqui, filed Sep. 22, 2003.
U.S. Appl. No. 13/909,275, by Shumin Zhai, filed Jun. 4, 2013.
International Preliminary Report on Patentability from counterpart International Application No. PCT/US2014/033318, mailed Oct. 29, 2015, 7 pp.
Office Action U.S. Appl. No. 13/909,275, dated Dec. 24, 2013, 16 pp.
Responsive Amendment and RCE for U.S. Appl. No. 13/909,275, filed Apr. 9, 2014, 21 pages.
International Search Report and Written Opinion from International Application No. PCT/US2014/033318, dated Aug. 1, 2014, 9 pp.
Non-Final Office Action from U.S. Appl. No. 14/471,610, mailed Sep. 27, 2016 16 pgs.
Response to Non-Final Office Action from U.S. Appl. No. 14/471,610, mailed Sep. 27, 2016, filed Dec. 20, 2016.
Notice of Office Action from counterpart Korean Application No. 10-2015-7032672, issued Nov. 17, 2016 15 pgs.
Final Office Action mailed Feb. 13, 2017 from U.S. Appl. No. 14/471,610 9 pgs.
Response to Final Office Action mailed Feb. 13, 2017 from U.S. Appl. No. 14/471,610, filed Feb. 24, 2017 2 pgs.
Notice of Allowance from U.S. Appl. No. 14/471,610, mailed Mar. 10, 2017 8 pgs.

* cited by examiner

CONSISTENT TEXT SUGGESTION OUTPUT

This application claims the benefit of U.S. Provisional Application No. 61/812,521, filed Apr. 16, 2013, the entire content of which is hereby incorporated by reference.

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a display device of a computing device may output a graphical (or "soft") keyboard that enables the user to enter data by indicating (e.g., by tapping) keys displayed at a presence-sensitive input device.

Some computing devices may determine one or more candidate character strings (e.g., candidate words included in a lexicon, such as a dictionary) based on data entered using the graphical keyboard. In some examples, a computing device may output a set of the candidate character strings for display at a plurality of text suggestion regions that enable the user to select (e.g., auto-complete) a character string by indicating (e.g., tapping or gesturing over) a text suggestion region of a display that displays a desired character string. In certain examples, each of the text suggestion regions may be associated with a rank, each rank corresponding to a relative probability of a candidate character string displayed within the text suggestion region. According to certain techniques, the computing device may output candidate character strings for display within the text suggestion regions based on a correspondence between a probability that the candidate character string represents a word included in the lexicon and the rank of a respective text suggestion region. For instance, the computing device may output a highest-probability candidate character string for display within a highest-ranked text suggestion region of the display, a second-highest probability candidate character string for display within a second-highest ranked text suggestion region, etc.

However, such techniques may have certain drawbacks. For example the text suggestion region within which a particular candidate character string is displayed may change due to, for example, different lexical contexts of the candidate character string (e.g., different preceding words). As such, a user may not be able to predict within which text suggestion region a particular candidate character string will be displayed in response to particular gesture input. Accordingly, such techniques may require a user to attend to (e.g., view) each of the plurality of text suggestion regions to determine within which text suggestion region a desired candidate character string is displayed, thereby reducing the speed at which the user is able to interact with the computing device to enter text.

SUMMARY

In one example, a method includes outputting, by a computing device and for display, a graphical user interface including a plurality of text suggestion regions, receiving, by the computing device, an indication of gesture input detected at a presence-sensitive input device, and selecting, by the computing device and based at least in part on the indication of the gesture input, a candidate character string from a plurality of candidate character strings. The method further includes determining, by the computing device, that the candidate character string was previously selected while being displayed within a particular text suggestion region from the plurality of text suggestion regions, and outputting, by the computing device, for display, and based at least in part on determining that the candidate character string was previously selected while being displayed within the particular text suggestion region, the candidate character string within the particular text suggestion region.

In another example, a computer-readable storage medium is encoded with instructions that, when executed, cause at least one processor of a computing device to output, for display, a graphical user interface including a plurality of text suggestion regions, receive an indication of gesture input detected at a presence-sensitive input device, and select, based at least in part on the indication of the gesture input, a candidate character string from a plurality of candidate character strings. The computer-readable storage medium is further encoded with instructions that, when executed, cause the at least one processor of the computing device to determine that the candidate character string was previously selected while being displayed within a particular text suggestion region from the plurality of text suggestion regions, and output, for display and based at least in part on determining that the candidate character string was previously selected while being displayed within the particular text suggestion region, the candidate character string within the particular text suggestion region.

In another example, a device includes at least one processor that is operatively coupled to a presence-sensitive input device, and at least one module operable by the at least one processor to output, for display, a graphical user interface including a plurality of text suggestion regions, receive an indication of gesture input detected at the presence-sensitive input device, and select, based at least in part on the indication of the gesture input, a candidate character string from a plurality of candidate character strings. The at least one module is further operable by the at least one processor to determine that the candidate character string was previously selected while being displayed within a particular text suggestion region from the plurality of text suggestion regions, and output, for display and based at least in part on determining that the candidate character string was previously selected while being displayed within the particular text suggestion region, the candidate character string within the particular text suggestion region.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques that may improve the ease with which a user may enter text using text suggestion regions by consistently outputting a particular candidate character string for display within a same text suggestion region each time a computing device receives gesture input to select one or more characters of the particular candidate character string. For example, a computing device may output, for display (e.g., at a presence-sensitive display), a graphical user interface including a graphical keyboard and a plurality of text suggestion regions (e.g., two, three, five, or more text suggestion regions). In response to receiving an indication of user input to select one or more keys of the graphical keyboard, the computing device may determine a plurality of candidate character strings (e.g., candidate words included in a lexicon, such as a dictionary) based on characters associated with the selected keys. The computing device may output a set of the candidate character strings for display within the text suggestion regions that enable the user to select (e.g., autocomplete) a candidate character string by indicating (e.g., by tapping) one of the text suggestion regions.

Rather than output a particular candidate character string for display within any one of a plurality of text suggestion regions based on a probability of the candidate character string that may change between instances of outputting the candidate character string, a computing device implementing techniques of this disclosure may consistently output a particular candidate character string for display within a same text suggestion region each time the computing device receives gesture input to select one or more characters of the particular candidate character string. For instance, the computing device may output a candidate character string for display within a particular text suggestion region based at least in part on determining that the candidate character string was previously selected while being displayed within the particular text suggestion region. As such, techniques of this disclosure may enable a user to predict within which text suggestion region the particular candidate character string will be displayed, thereby enabling the user to select the particular candidate character string from the particular text suggestion region without requiring the user to attend to (e.g., view) others of the text suggestion regions. In this way, techniques described herein may enable a computing device to increase the rate at which a user may enter text, thereby improving usability of the computing device.

Figure 1:
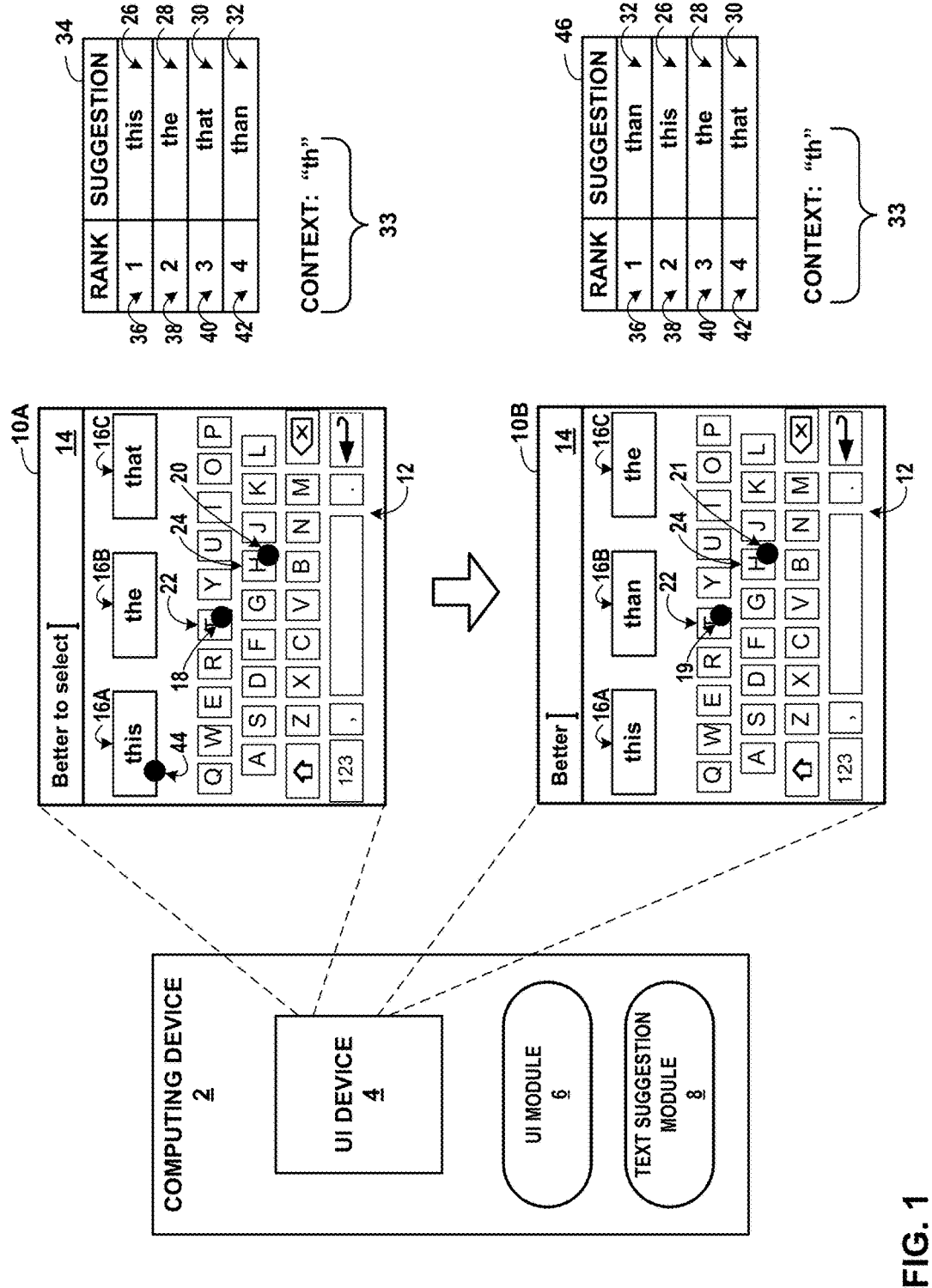
FIG. 1 is a block diagram illustrating an example computing device that may be used to output a candidate character string at a text suggestion region of a graphical user interface, in accordance with one or more aspects of this disclosure.

FIG. 1 is a block diagram illustrating an example computing device 2 that may be used to output a candidate character string at a text suggestion region of a graphical user interface, in accordance with one or aspects of this disclosure. In some examples, computing device 2 may be associated with a user that may interact with computing device 2 by providing various user inputs to the computing device. Examples of computing device 2 may include, but are not limited to, portable or mobile devices such as mobile phones (including smartphones), laptop computers, desktop computers, tablet computers, smart television platforms, personal digital assistants (PDA's), servers, mainframes, etc. Computing device 2, in some examples, may include user interface (UI) device 4, UI module 6, and text suggestion module 8. Other examples of computing device 2 that implement techniques of this disclosure may include additional components not shown in FIG. 1.

Computing device 2 may include UI device 4. In some examples, UI device 4 is configured to receive tactile, audio, or visual input. Examples of UI device 4 may include a touch-sensitive and/or a presence-sensitive screen, mouse, keyboard, voice responsive system, microphone, camera or other device for receiving input. For example, UI device 4 may include a presence-sensitive display that may detect the presence of an input unit (e.g., a finger, pen, stylus, and the like) performing one or more gestures. UI device 4 may output for display content such as graphical user interfaces (GUIs) 10A-10B (collectively referred to herein as "GUIs 10"). GUIs 10 may include text display region 14, graphical keyboard 12, text suggestion regions 16A-16C (collectively referred to herein as "text suggestion regions 16"), or other display regions.

As shown in FIG. 1, computing device 2 may include UI module 6. UI module 6 may perform one or more functions to receive input, such as user input, and send indications of such input to other components associated with computing device 2, such as text suggestion module 8. UI module 6 may also receive data from components associated with computing device 2, such as text suggestion module 8. Using the data, UI module 6 may cause components associated with computing device 2, such as UI device 4, to provide output based on the data. For instance, UI module 6 may receive data from text suggestion module 8, and may cause UI device 4 to display GUIs 10 based on such data, such as by causing UI device 4 to display one or more candidate character strings within text display regions 16 in accordance with techniques described herein. In some examples, UI module 6 may include functionality associated with one or more applications executable by computing device 2, such as one or more of a word-processing application, text messaging application, spreadsheet, web browser, server application, or other applications. In certain examples, UI module 6 may be implemented as an application executable by one or more processors of computing device 2, such as a downloadable or pre-installed application or "app." In some examples, UI module 6 may be implemented as part of a hardware unit of computing device 2. As another example, UI module 6 may be implemented as part of an operating system of computing device 2.

As shown in FIG. 1, GUIs 10 may each be an interface generated by UI module 6 to enable a user to interact with computing device 2. GUIs 10 may each include graphical content. Graphical content, generally, may be any visually displayable graphical object of a graphical user interface. Examples of graphical content may include text, images, a group of moving images, hyperlink, animation, video, characters of a character set etc. As shown in FIG. 1, graphical content may include graphical keyboard 12, text display region 14, text suggestion regions 16, as well as one or more candidate character strings displayed within text suggestion regions 16.

Graphical keyboard 12 may include a plurality of keys, such as "T" key 22 and "H" key 24. In some examples, each of the plurality of keys included in graphical keyboard 12 represents a single character. In other examples, one or more of the plurality of keys included in graphical keyboard 12 represents a group of characters selected based on a plurality of modes. Graphical keyboard 12 may be displayed by UI device 4 as an ordered set of selectable keys. Keys may represent a single character from a character set (e.g., letters of the English alphabet), or may represent combinations of characters. One example of a graphical keyboard may include a traditional "QWERTY" keyboard layout. Other examples may contain characters for different languages, different character sets, or different character layouts. As shown in the example of FIG. 1, graphical keyboard 12 includes a version of the traditional "QWERTY" keyboard layout for the English language providing character keys as well as various keys (e.g., the "123" key) providing other functionality.

In some examples, text display region 14 may include characters or other graphical content that are included in, for example, a text-message, a document, an e-mail message, a web browser, and the like. For instance, text display region 14 may include characters or other graphical content that are selected by a user via gestures performed at UI device 4. In some examples, text suggestion regions 16 may each display a candidate character string, such as a candidate word included in a lexicon (e.g., the English language). As illustrated in the example of FIG. 1, text suggestion regions 16 may be different regions of GUIs 10 than text display region 14. In other examples, text suggestion regions 16 may be a single region of GUIs 10, and may include one or more regions of GUIs 10 that are the same as text display region 14. Similarly, while illustrated as separate regions in the example of FIG. 1, text suggestion regions 16, in some examples, may be a single region of GUIs 10.

UI module 6 may cause UI device 4 to display graphical keyboard 12 and detect gesture input, such as gesture input detected at one or more locations of UI device 4 that display one or more keys of graphical keyboard 12, and one or more locations of UI device 4 that display text suggestion regions 16. Additionally, text suggestion module 8 may determine one or more candidate character strings based at least in part on one or more characters associated with selected keys of graphical keyboard 12. Text suggestion module 8 may cause UI device 4 to display one or more of the candidate character strings within one or more of text suggestion regions 16, in accordance with techniques described herein.

According to techniques of the present disclosure, computing device 2 may improve the ease with which a user may enter text (e.g., within text display region 14) using text suggestion regions (e.g., text suggestion regions 16) by consistently outputting a particular candidate character string at a same text suggestion region each time computing device 2 receives gesture input to select one or more characters of the particular candidate character string. For example, using techniques of this disclosure, a computing device may output a candidate character string for display within a particular text suggestion region based at least in part on a determination, by computing device 2, that the candidate character string was previously selected while being displayed at the particular text suggestion region. As such, techniques of this disclosure may enable a user to predict within which text suggestion region the particular candidate character string will be displayed, thereby increasing the rate at which the user provide gesture input to select the particular candidate character string.

As illustrated in FIG. 1, UI device 4 may output GUIs 10 including graphical keyboard 12 for display at UI device 4. UI device 4 (e.g., a presence-sensitive and/or touch-sensitive display) may receive an indication of gesture input detected at locations 18 and 20 of graphical keyboard 12. In response to receiving the indication of gesture input detected at location 18 (e.g., an indication of a touch input detected at location 18), UI module 6 may select "T" key 22 as a first selected key of graphical keyboard 12, such as by determining that location 18 corresponds to a location of graphical keyboard 12 that displays "T" key 22. Similarly, in response to receiving the indication of gesture input detected at location 20 (e.g., an indication of a touch input detected at location 20), UI module 6 may select "H" key 24 as a second selected key of graphical keyboard 12, such as by determining that location 20 corresponds to a location of graphical keyboard 12 that displays "H" key 24. While illustrated in FIG. 1 with respect to multiple gesture inputs detected at locations 18 and 20 to select "T" key 22 and "H" key 24, aspects of this disclosure are not so limited. For instance, in some examples, such as when graphical keyboard 12 includes functionality of a gesture keyboard, UI module 6 may select "T" key 22 and "H" key 24 in response to receiving an indication of a single continuous gesture input detected from location 18 to location 20 such that UI device 4 detects the presence of an input unit (e.g., a finger, pen, stylus, and the like) from location 18 to location 20 of graphical keyboard 12.

Text suggestion module 8 may determine a plurality of candidate character strings in response to selecting "T" key 22 and "H" key 24 as selected keys of graphical keyboard 12. Each respective candidate character string may include a group of predicted characters that includes characters associated with the selected keys. For instance, in the example of FIG. 1, text suggestion module 8 may determine a plurality of candidate character strings for which the characters "T" and "H", corresponding to "T" key 22 and "H" key 24 respectively, are a prefix. As illustrated in FIG. 1, text suggestion module 8 may determine the plurality of candidate character strings including character string 26 (i.e., the character string including the plurality of characters "this"), character string 28 (i.e., the character string including the plurality of characters "the"), character string 30 (i.e., the character string including the plurality of characters "that"), and character string 32 (i.e., the character string character string including the plurality of characters "than"). While illustrated with respect to four candidate character strings 26, 28, 30, and 32, text suggestion module 8 may determine other numbers of candidate character strings, such as two candidate character strings, five candidate character strings, fifty candidate character strings, or other numbers of candidate character strings.

Text suggestion module 8 may determine a ranked ordering of the plurality of candidate character strings based at least in part on a probability of each respective candidate character string from the plurality of candidate character strings. For instance, as described in further detail below, text suggestion module 8 may compare each respective candidate character string from the plurality of candidate character stings with a language model to determine a probability of each respective candidate character string, such as a probability that each respective candidate character string represents a word included in a lexicon (e.g., the English language) or a probability that each respective character string represents a next word of a multi-word phrase. As illustrated in the example of FIG. 1, text suggestion module 8 may determine ranked ordering 34 of the plurality of candidate character strings 26, 28, 30, and 32.

As illustrated, text suggestion module 8 may associate each of the plurality of candidate character strings with a respective rank, such that ranked ordering 34 represents an ordered arrangement of the plurality of candidate character strings according to a probability of each respective candidate character string. For instance, in the example of FIG. 1, ranked ordering 34 includes first rank 36, second rank 38, third rank 40, and fourth rank 42. In this example, ranks 36, 38, 40, and 42 each correspond to a probability that an associated candidate character string represents a next word of a multi-word phrase included in text display region 14. In addition, in the example of FIG. 1, ranks 36, 38, 40, and 42 are arranged in descending order of probability, such that rank 36 is associated with a candidate character string corresponding to a highest relative probability that the candidate character string represents a next word of the multi-word phrase included in text display region 14, and rank 42 is associated with a candidate character string corresponding to a lowest relative probability that the candidate character string represents a next word of the multi-word phrase included in text display region 14. In other examples, text suggestion module 8 may determine ranked ordering 34 such that ranks 36, 38, 40, and 42 are arranged in ascending order of probability. Similarly, in some examples, such as when the plurality of candidate character strings includes more than four candidate character strings or fewer than four candidate character strings, text suggestion module 8 may determine ranked ordering 34 as including more than four ranks or fewer than four ranks. In certain examples, text suggestion module 8 may determine ranked ordering 34 as including a number of ranks equal to the number of candidate character strings included in the plurality of candidate character strings, such that each of the plurality of candidate character strings is associated with a rank within ranked ordering 34. In some examples, a rank of candidate character strings included within a ranked ordering (e.g., ranked ordering 34) may be implicit in the ordering the candidate character strings included within the list of candidate character strings, and actual ranking values need not necessarily be stored in associated with candidate character strings.

In addition, text suggestion module 8 may associate each of text suggestion regions 16A-16C with a respective rank corresponding to a probability of a candidate character string that is displayed within the respective one of text suggestion regions 16. In this way, text suggestion module 8 may determine a ranked ordering of text suggestion regions 16, such that each of text suggestion regions 16 is associated with a rank corresponding to a respective rank of an associated candidate character string (e.g., a rank stored in a data structure associated with the candidate character strings, an ordering or cardinality of the plurality of candidate character strings that corresponds with an ordering or cardinality of the rankings of text suggestion regions 16, etc. For instance, in the example of FIG. 1, text suggestion module 8 determines a ranked ordering of text suggestion regions 16 such that text suggestion region 16A corresponds to a highest probability candidate character string, text suggestion region 16B corresponds to a second-highest probability candidate character string, and text suggestion region 16C corresponds to a third-highest probability candidate character string. In other examples, text suggestion module 8 may determine different ranked orderings of text suggestion regions 16, such as a ranked ordering that associates text suggestion region 16B with a highest probability candidate character string. In general, text suggestion module 8 may determine any ranked ordering of text suggestion regions 16, such that each respective one of text suggestion regions 16 corresponds to a different rank that associates the respective one of text suggestion regions 16 with a respective rank within the plurality of candidate character strings.

Text suggestion module 8 may cause UI device 4 to output a set of the plurality of candidate character strings 26, 28, 30, and 32 for display at GUI 10A within text suggestion regions 16 in accordance with ranked ordering 34. For example, as illustrated in FIG. 1, text suggestion module 8 may cause UI device 4 to output candidate character strings 26, 28, and 30 for display within text suggestion regions 16 in accordance with ranked ordering 34. That is, in this example, text suggestion module 8 may determine that candidate character string 26 is associated with rank 36 (i.e., a highest rank of ranked ordering 34) that matches a rank associated with text suggestion region 16A (i.e., a highest rank of the ranked ordering of text suggestion regions 16). In response, text suggestion module 8 may cause UI device 4 to output candidate character string 26 for display within text suggestion region 16A. Similarly, text suggestion module 8 may determine that candidate character string 28 is associated with rank 38 (i.e., a second-highest rank of ranked ordering 34) that matches a rank associated with text suggestion region 16B (i.e., a second-highest rank of the ranked ordering of text suggestion regions 16), and may cause UI device 4 to output candidate character string 28 for display within text suggestion region 16B. Finally, text suggestion module 8 may determine that candidate character string 30 is associated with rank 40 (i.e., a third-highest rank of ranked ordering 34) that matches a rank associated with text suggestion region 16C (i.e., a third-highest rank of the ranked ordering of text suggestion regions 16), and may cause UI device 4 to output candidate character string 30 for display within text suggestion region 16C. In this way, text suggestion module 8 may cause UI device 4 to output a set of candidate character strings 26, 28, 30, and 32 (i.e., the set of the plurality of candidate character strings including candidate character strings 26, 28, and 30) for display within text suggestion regions 16 in accordance with ranked ordering 34.

UI module 6 may receive an indication of gesture input detected at a location of UI device 4 to select a candidate character string displayed within one of text suggestion regions 16. For example, UI module 6 may receive an indication of gesture input detected at location 44 of GUI 10A. In response, UI module 6 may select candidate character string 26 (i.e., the candidate character string displayed within text suggestion region 16A), such as by determining that location 44 corresponds to a location of UI device 4 that displays text suggestion region 16A. UI module 6 may cause UI device 4 to output candidate character string 26 (i.e., the candidate character string including the characters "this") for display within text display region 14. In this way, computing device 2 may enable a user of computing device 2 to select (e.g., auto-complete) a character string for display within text display region 14 without requiring the user to provide gesture input to select keys of graphical keyboard 12 associated with each of the characters included in the character string.

In addition, as UI module 6 receives indications of gesture input to select one or more keys of graphical keyboard 12 (e.g., indications of gesture input detected at locations 18 and 20 of graphical keyboard 12), text suggestion module 8 may determine a context of the gesture input responsive to which text suggestion module 8 determines the plurality of candidate character strings. As illustrated in FIG. 1, context 33 may include a representation of character "T" corresponding to the selected "T" key 22 and a representation of character "H" corresponding to the selected "H" key 24 (e.g., character string "th" in this example). As another example, the context of the gesture input may include a representation of one or more the keys of graphical keyboard 12, such as "T" key 22 and "H" key 24. As another example, the context of the gesture input may include a representation of location 18 and a representation of location 20 of graphical keyboard 12, such as a centroid of a group of pixels corresponding to a touch point of location 18 of UI device 4 (e.g., a presence-sensitive and/or touch-sensitive device, such as a presence-sensitive and/or touch-sensitive screen) and a centroid of a group of pixels of corresponding to a touch point of location 20 of UI device 4. As yet another example, the context of the gesture input may include a representation of a relative location of GUI 10A corresponding to location 18 of graphical keyboard 12 and a relative location of GUI 10A corresponding to location 20 of graphical keyboard 12, such as an X-Y coordinate pair of each of a locations 18 and 20 as determined from a predefined reference point of GUI 10A, such as an upper-left corner of GUI 10A. In some examples, the context may include previous and/or subsequent words and/or characters relative to one or more selected characters. In certain examples, the context may include information such as a type and/or version of an application used to input characters, a type of input field used to input characters (e.g., text input field, password field, date field, or other types of fields), a time of day at which computing device 2 receives the indication of the gesture input, a geographical location of computing device 2 while computing device 2 receives the indication of the gesture input, etc. In general, text suggestion module 8 may determine the context of the gesture input as any characteristic of the gesture input that identifies, characterizes, and/or accompanies the gesture input responsive to which text suggestion module 8 determines the plurality of candidate character strings. In some examples, the context may uniquely identify the gesture input.

In certain examples, text suggestion module 8 continuously determines the context of the gesture input as UI module 6 receives indications of gesture input to select one or more keys of graphical keyboard 12. In some examples, text suggestion module 8 initiates and/or restarts the determination of the context of the gesture input in response to receiving gesture input to select a next word or sentence, such as gesture input to select a delimiter key (e.g., a space key, a punctuation key, or other delimiter key) of graphical keyboard 12.

In some examples, text suggestion module 8 generates a data structure that associates the context of the gesture input with a selected candidate character string and the particular text suggestion region within which the selected candidate character string was displayed while selected. For instance, in the example of FIG. 1, text suggestion module 8 may determine context 33 of candidate character string 26 as the character string "th" (i.e., a character string including characters associated with "T" key 22 and "H" key 24). In response to receiving the indication of gesture input detected at location 44 of GUI 10A to select candidate character string 26 displayed within text suggestion region 16A, text suggestion module 8 may generate and/or maintain a data structure that associates the character string "th" (i.e., context 33 in this example) with candidate character string 26 (i.e., the character string "this") and text suggestion region 16A (i.e., the particular text suggestion region within which candidate character string was displayed while selected). In some examples, text suggestion module 8 may associate context 33, candidate character string 26, and a location of text suggestion region 16A (e.g., x-y coordinates of UI device 4 corresponding to text suggestion region 16A). Text suggestion module 8 may similarly maintain the data structure to associate other candidate character strings (i.e., candidate character strings other than candidate character string 26) with a context of gesture input and a particular text suggestion region. In this way, text suggestion module 8 may generate and/or maintain a data structure that associates multiple candidate character strings (e.g., tens, hundreds, thousands, or other numbers of candidate character strings) with an associated with context of gesture input and a particular text suggestion region.

According to techniques described herein, text suggestion module 8 may traverse the data structure as UI module 6 receives subsequent gesture input to select one or more keys of graphical keyboard 12 (i.e., gesture input received after UI module 6 selects the candidate character string and causes UI module 4 to output the candidate character string for display within text display region 14). In examples where text suggestion module 8 determines that the received gesture input corresponds to a context included in the data structure (e.g., context 33), text suggestion module 8 causes UI device 4 to output the candidate character string associated with the context for display within the particular text suggestion region associated with the context. Accordingly, text suggestion module 8 may cause UI device 4 to consistently output a particular candidate character string for display within a same text display region each time UI module 6 receives an indication of gesture input that corresponds to the context of gesture input associated with the particular candidate character string.

For example, as illustrated in FIG. 1, UI module 6 may cause UI device 4 to output GUI 10B for display (e.g., at a presence-sensitive display). In the example of FIG. 1, GUI 10B represents an example of GUIs 10 output by UI module 6 for display subsequent to receiving the indication of gesture input detected at location 44 and selecting candidate character string 26 for display within text display region 14. That is, in the example of FIG. 1, GUIs 10A and 10B, when taken together, illustrate an example where computing device 2 outputs GUI 10A and receives an indication of gesture input to select candidate character string 26 displayed within text suggestion region 16A at a first time, then subsequently outputs GUI 10B at a second time (e.g., during a subsequent power-cycle of computing device 2, during a separate instance of a particular application executing on one or more processors of computing device 2, or during an instance of a separate application executing on one or more processors of computing device 2).

As illustrated in FIG. 1, UI module 6 may cause UI device 4 to output GUI 10B including graphical keyboard 12, text display region 14, and text suggestion regions 16. As illustrated by like numerals, graphical keyboard 12, text display region 14, and text suggestion regions 16 of GUI 10B may be substantially similar to graphical keyboard 12, text display region 14, and text suggestion regions 16 of GUI 10A. As illustrated, UI module 6 may receive an indication of gesture input detected at locations 19 and 21 of graphical keyboard 12. In response to receiving the indication of gesture input detected at location 19, UI module 6 may select "T" key 22 as a first selected key of graphical keyboard 12. Similarly, in response to receiving the indication of gesture input detected at location 21, UI module 6 may select "H" key 24 as a second selected key of graphical keyboard 12.

In response to selecting "T" key 22 and "H" key 24 as selected keys of graphical keyboard 12, text suggestion module 8 may determine a plurality of candidate character strings for which the character string "th" is a prefix. For instance, as was similarly described with respect to the example of GUI 10A, text suggestion module 8 may determine the plurality of candidate character strings including candidate character strings 26, 28, 30, and 32.

Text suggestion module 8 may determine ranked ordering 46 of the plurality of candidate character strings 26, 28, 30, and 32, such as by comparing each of candidate character strings 26, 28, 30, and 32 to a language model to determine a probability of each of candidate character strings 26, 28, 30, and 32. For instance, text suggestion module 8 may compare each of candidate characters 26, 28, 30, and 32 to a language model, such as an n-gram language model, to determine a probability that each of the candidate character strings follows the character string "Better" displayed within text display region 14. In this example, text suggestion module 8 determines that candidate character string 32 (i.e., the candidate character string "than") is associated with a highest relative probability (e.g., a highest probability within the plurality of candidate character strings 26, 28, 30, and 32) that the candidate character string represents the next word of a multi-word phrase displayed within text display region 14. That is, in this example, text suggestion module 8 determines that the multi-word phrase "Better than" is associated with a higher probability than each of the multi-word phrases "Better this," "Better the," and "Better that" corresponding to candidate character strings 26, 28, and 30, respectively. Similarly, in this example, text suggestion module 8 determines that candidate character string 26 is associated with second rank 38 indicating a second-highest probability candidate character string, candidate character string 28 is associated with third rank 40 indicating a third-highest probability candidate character string, and candidate character string 30 is associated with fourth rank 42 indicating a fourth-highest probability candidate character string.

Text suggestion module 8 may determine that candidate character string 32 (i.e., the character string "than"), associated with first rank 36, corresponds to text suggestion region 16A (i.e., the text suggestion region associated with a rank corresponding to a highest probability candidate character string). Similarly, text suggestion module 8 may determine that candidate character string 26 (i.e., the character string "this"), associated with second rank 38, corresponds to text suggestion region 16B.

Text suggestion module 8 may determine a context of the gesture input responsive to which text suggestion module 8 determines the plurality of candidate character strings 26, 28, 30, and 32. For example, text suggestion module 8 may determine context 33 of the gesture input as the character string "th" corresponding to characters associated with selected "T" key 22 and selected "H" key 24, respectively. Text suggestion module 8 may traverse the data structure that associates a context of received gesture input with candidate character strings and text display regions to determine whether the determined context of the gesture input (e.g., context 33 in this example) corresponds to a context included within the data structure. For instance, text suggestion module 8 may traverse the data structure to determine that context 33 (e.g., character string "th") corresponds to candidate character string 26 (i.e., the character string "this") and text suggestion region 16A (i.e., a particular text suggestion region within which candidate character string 26 was previously displayed while selected).

In response to determining that the context 33 corresponds to candidate character string 26 and text suggestion region 16A, text suggestion module 8 may cause UI module 6 to output candidate character string 26 for display within text suggestion 16A. That is, as discussed above, text suggestion module 8 may determine that candidate character string 26 is associated with second rank 38 corresponding to text suggestion region 16B and candidate character string 32 is associated with first rank 36 corresponding to text suggestion region 16A. Rather than output candidate character string 26 for display within text suggestion region 16B, text suggestion module 8 may output, based at least in part on determining that candidate character string 26 was previously selected while being displayed within text suggestion region 16A, candidate character string 26 for display within text suggestion region 16A. Similarly, rather than output candidate character string 32 for display within text suggestion region 16A, text suggestion module 8 may output, based at least in part on determining that candidate character string 26 was previously selected while being displayed within text suggestion region 16A, candidate character string 32 for display within text suggestion region 16B.

In this way, computing device 2 may consistently output a particular candidate character string for display within the same text suggestion region each time the computing device outputs the candidate character string for display within a plurality of text suggestion regions. As such, according to techniques described herein, computing device 2 may enable a user to predict within which of a plurality of text suggestion regions a particular candidate character string will be displayed in response to particular gesture input, and thereby increase the rate at which a user may use the text suggestion regions to enter text.

Figure 2:
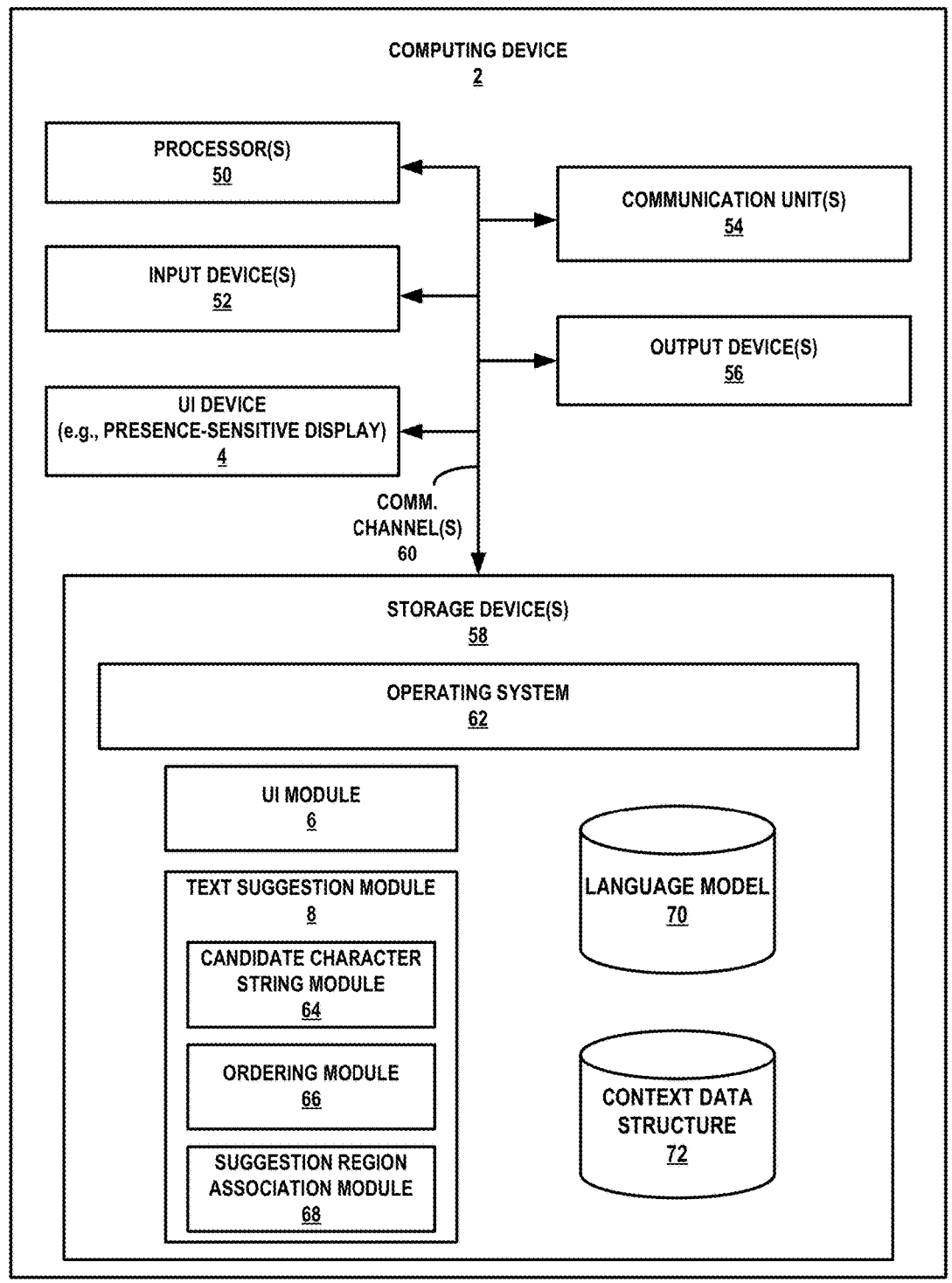
FIG. 2 is a block diagram illustrating further details of one example of a computing device shown in FIG. 1, in accordance with one or more aspects of this disclosure.

FIG. 2 is a block diagram illustrating further details of one example of a computing device shown in FIG. 1, in accordance with one or more aspects of this disclosure. FIG. 2 illustrates only one particular example of computing device 2, and many other examples of computing device 2 may be used in other instances.

As shown in the specific example of FIG. 2, computing device 2 includes one or more processors 50, one or more input devices 52, UI device 4, one or more communication units 54, one or more output devices 56, and one or more storage devices 58. As illustrated, computing device 2 may further include UI module 6, text suggestion module 8, and operating system 62 that are executable by computing device 2 (e.g., by one or more processors 40). Similarly, as illustrated, text suggestion module 8 may include candidate character string module 64, ordering module 66, and suggestion region association module 68 that are executable by computing device 2. Computing device 2, in one example, further includes language model 70 and context data structure 72.

Each of components 4, 50, 52, 54, 56, and 58 may be interconnected (physically, communicatively, and/or operatively) for inter-component communications. In some examples, communication channels 60 may include a system bus, a network connection, an inter-process communication data structure, or any other method for communicating data. As one example in FIG. 2, components 4, 50, 52, 54, 56, and 58 may be coupled by one or more communication channels 60. UI module 6, text suggestion module 8, candidate character string module 64, ordering module 66, and suggestion region association module 68 may also communicate information with one another as well as with other components of computing device 2, such as language model 70 and context data structure 72.

Processors 50, in one example, are configured to implement functionality and/or process instructions for execution within computing device 2. For example, processors 50 may be capable of processing instructions stored in storage device 58. Examples of processors 50 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 58 may be configured to store information within computing device 2 during operation. Storage device 58, in some examples, is described as a computer-readable storage medium. In some examples, storage device 58 is a temporary memory, meaning that a primary purpose of storage device 58 is not long-term storage. Storage device 58, in some examples, is described as a volatile memory, meaning that storage device 58 does not maintain stored contents when the computer is turned off. Examples of volatile memories include random access memories (RAM), dynamic random access memories (DRAM), static random access memories (SRAM), and other forms of volatile memories known in the art. In some examples, storage device 58 is used to store program instructions for execution by processors 50. Storage device 58, in one example, is used by software or applications running on computing device 2 (e.g., text suggestion module 8) to temporarily store information during program execution.

Storage devices 58, in some examples, also include one or more computer-readable storage media. Storage devices 58 may be configured to store larger amounts of information than volatile memory. Storage devices 58 may further be configured for long-term storage of information. In some examples, storage devices 58 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 54. Computing device 2, in one example, utilizes communication unit 54 to communicate with external devices via one or more networks, such as one or more wireless networks. Communication unit 54 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 54 to wirelessly communicate with an external device such as a server.

Computing device 2, in one example, also includes one or more input devices 52. Input device 52, in some examples, is configured to receive input from a user through tactile, audio, or video feedback. Examples of input device 52 include a presence-sensitive display, a mouse, a keyboard, a voice responsive system, video camera, microphone or any other type of device for detecting a command from a user. In some examples, a presence-sensitive display includes a touch-sensitive screen.

One or more output devices 56 may also be included in computing device 2. Output device 56, in some examples, is configured to provide output to a user using tactile, audio, or video stimuli. Output device 56, in one example, includes a presence-sensitive display, a sound card, a video graphics adapter card, or any other type of device for converting a signal into an appropriate form understandable to humans or machines. Additional examples of output device 56 include a speaker, a cathode ray tube (CRT) monitor, a liquid crystal display (LCD), or any other type of device that can generate intelligible output to a user.

In some examples, UI device 4 may include functionality of input device 52 and/or output device 56. In one example, UI device 4 may be a touch-sensitive screen. In the example of FIG. 2, UI device 4 may be a presence-sensitive display. In some examples, a presence sensitive display may detect an object, such as an input unit (e.g., user's finger, pen, stylus, etc.) at and/or near the screen of the presence-sensitive display. As one example range, a presence-sensitive display may detect an input unit that is within 2 inches or less of the physical screen of the presence-sensitive display. The presence-sensitive display may determine one or more locations (e.g., (x,y) coordinates) of the presence-sensitive display at which the input unit was detected. In another example range, a presence-sensitive display may detect an object 6 inches or less from the physical screen of the presence-sensitive display and other exemplary ranges are also possible. The presence-sensitive display may determine the location of the display selected by an input unit using capacitive, inductive, and/or optical recognition techniques. In some examples, the presence sensitive display provides output to a user using tactile, audio, or video stimuli as described with respect to output device 56.

Computing device 2 may include operating system 62. Operating system 62, in some examples, controls the operation of components of computing device 2. For example, operating system 62, in one example, facilitates the communication of UI module 6, text suggestion module 8, candidate character string module 64, ordering module 66, and/or suggestion region association module 68 with processors 50, communication unit 54, storage device 58, input device 52, and output device 56. UI module 6, text suggestion module 8, candidate character string module 64, ordering module 66, and suggestion region association module 68 may each include program instructions and/or data that are executable by computing device 2. As one example, text suggestion module 8 may include instructions that cause computing device 2 to perform one or more of the operations and actions described in the present disclosure.

Computing device 2 may include language model 70. Language model 70 may include a lexicon. In some examples, a lexicon may include a listing of words and may include additional information about the listed words. A lexicon may be represented by one or more data structures, such as by one or more of an array, a list, a tree, or other data structures. For example, language model 70 may include a lexicon stored in a trie data structure. In some examples, language model 70 may be a default dictionary installed on computing device 2. In certain examples, language model 70 may include a group of predefined phrases installed on computing device 2. In other examples, language model 70 may include multiple sources of lexicons, which may be stored at computing device 2 or stored at one or more remote computing devices that are accessible to computing device 2 via one or more communication channels. In some examples, language model 70 may be implemented in the firmware of computing device 2.

Language model 70 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots x_{i-1})$). For instance, a bigram language model (an n-gram model where n=2), may provide a probability that the letter "i" follows the sequence of letters "th". As another example, a bigram language model may provide a probability that the word "this" follows the word "better". In some examples, language model 70 includes a lexicon trie with integrated language model frequency information. For instance, each node of the lexicon trie may include a representation of a letter and a probability value.

Computing device 2 may include context data structure 72 that associates a representation of a context of a gesture input, a candidate character string, and a text suggestion region. For instance, context data structure 72 may associate a context of a gesture input, such as one or more selected characters associated with the gesture input, a candidate character string that includes the one or more selected characters, and a particular text suggestion region of a GUI within which the candidate character string was previously displayed while selected. Examples of context data structure 72 may include, but are not limited to, an array, a table, a list, a tree, a hash table, or other data structures capable of associating a representation of a context of gesture input, a candidate character string, and a text suggestion region. In some examples, context data structure 72 and language model 70 may be represented as a single data structure.

Techniques of the present disclosure may improve the speed with which a user can enter text into a computing device. Using techniques of this disclosure, a computing device may consistently output a particular candidate character string for display within the same text suggestion region each time the computing device outputs the candidate character string for display in response to receiving particular gesture input. As such, according to techniques described herein, the computing device may enable a user to predict within which of a plurality of text suggestion regions a candidate character string will be displayed in response to a particular gesture input, thereby enabling the user to quickly and efficiently select the candidate character string.

UI module 6 may output for display at UI device 4 a graphical user interface including a plurality of text suggestion regions. For instance, UI module 6 may output the plurality of text suggestion regions 16 for display within GUIs 10. In some examples, UI module 6 may output a graphical keyboard, such as graphical keyboard 12, for display at UI device 4 within GUIs 10. In response to receiving an indication of gesture input detected at a location of UI device 4 that displays graphical keyboard 12, UI module 6 may select one or more keys of graphical keyboard 12 as selected keys. For example, in response to receiving indications of gesture input detected at locations 18 and 20 of graphical keyboard 12, UI module 6 may select "T" key 22 and "H" key 24 as selected keys of graphical keyboard 12.

Candidate character string module 64 may determine a plurality of candidate character strings based at least in part on one or more characters associated with the one or more selected keys. For instance, candidate character string module 64 may access language model 70 to determine a plurality of candidate character strings, such as a plurality of candidate words included in a lexicon (e.g., the English language). As an example, candidate character string module 64 may access language model 70 to determine the plurality of candidate character strings 26, 28, 30, and 32. In some examples, candidate character string module 64 may determine the plurality of candidate character strings for which the one or more characters associated with the one or more selected keys are a prefix.

Candidate character string module 64 may determine a context of the gesture input, responsive to which candidate character string module 64 determines the plurality of candidate character strings. For example, the context may include a representation of one or more keys of graphical keyboard 12, such as "T" key 22 and "H" key 24. As another example, the context of the gesture input may include a representation of one or more characters associated with selected keys, such as a representation of the character "T" corresponding to the selected "T" key 22 and a representation of the character "H" corresponding to the selected "H" key 24. As another example, the context may include a representation of the location of UI device 4 that detects the gesture input, such as a representation of location 18 and a representation of location 20 of graphical keyboard 12 (e.g., a centroid of a group of pixels corresponding to each of the touch points of locations 18 and 20).

In some examples, candidate character string module 64 may include within context data structure 72 a numerical indication (e.g., a counter or other numerical representation) of a number of times that a particular candidate character string is selected while being displayed within a particular text suggestion region. For instance, candidate character string module 64 may increment and/or decrement a counter that represents the number of times candidate character string 26 is selected while being displayed within text suggestion region 16A.

As one example, candidate character string module 64 may increment the counter in response to receiving user input to select the candidate character string while the candidate character string is displayed within the particular text suggestion region. Similarly, candidate character string module 64 may decrement the counter in response to determining that no user input is received to select the candidate character string while the candidate character string is displayed within the particular text suggestion region. For instance, candidate character string module 64 may decrement the counter in response to receiving subsequent indications of gesture input to select keys of graphical keyboard 12 when the candidate character string is displayed within the particular text suggestion region (e.g., the user continues to type).

As another example, candidate character string module 64 may decrement the counter in response to receiving an indication of gesture input to select a different candidate character string displayed within a different text suggestion region while the particular candidate character string is displayed within the particular text suggestion region. In certain examples, candidate character string module 64 may decrement the counter by a first amount (e.g., by a value of one) in response to determining that no user input is received to select the candidate character string while the candidate character string is displayed within the particular text suggestion region, and may decrement the counter by a second, different amount (e.g., by a value of two) in response to receiving an indication of gesture input to select a different candidate character string displayed within a different text suggestion region while the particular candidate character string is displayed within the particular text suggestion region.

In certain examples, candidate character string module 64 may compare the counter associated with a particular context to a threshold value, such as a value of one, three, five, ten, or other threshold values. In some examples, candidate character string module 64 may remove the data associated with the particular context and particular candidate character string in response to determining that the counter satisfies the threshold value (e.g., is less than and/or equal to the threshold value).

Ordering module 66 may determine a ranked ordering of the plurality of candidate character strings. For example, ordering module 66 may compare each respective candidate character string from the plurality of candidate character strings to language model 70 to determine a probability of each respective candidate character string, such as a probability that each respective candidate character string represents a word included in a lexicon, a next word of a multi-word phrase, and the like. Ordering module 66 may associate each of the plurality of candidate character strings with a respective rank, such that the plurality of candidate character strings are ranked in an ordered arrangement based at least in part on the determined probability of each respective candidate character string from the plurality of candidate character strings.

In some examples, suggestion region association module 68 may associate a set of the plurality of candidate character strings with the plurality of text suggestion regions (e.g., text suggestion regions 16) based at least in part on the ranked ordering of the plurality of candidate character strings. For example, suggestion region association module 68 may determine a ranked ordering of the plurality of text suggestion regions, such that each respective text suggestion region from the plurality of text suggestion regions is associated with a respective rank that corresponds to one of the ranks within the ranked ordering of the plurality of candidate character strings. Suggestion region association module 68 may, in certain examples, each candidate character string that is associated with a rank that matches a rank of the plurality of text suggestion regions with the text suggestion region corresponding to the matching rank. Suggestion region association module 68 may output the set of the plurality of candidate character strings for display within the associated text suggestion region.

In certain examples, UI module 6 may receive an indication of a selection of a candidate character string. For instance, UI module 6 may receive an indication of gesture input detected at a location of UI device 4 corresponding to one of the text suggestion regions. In response, UI module 6 may select the candidate character string associated with the text suggestion region (e.g., the candidate character string displayed within the selected text suggestion region). As another example, UI module 6 may receive an indication of gesture input detected at delimiter key (e.g., a space key, a punctuation key, etc.) of graphical keyboard 12 and may select one of the candidate character strings and associated text suggestion regions in response (e.g., the candidate character string and/or text suggestion region associated with the highest probability).

In response to receiving the indication of the selection of a particular candidate character string (e.g., candidate character string 26) while the particular candidate character string is displayed within a particular text suggestion region (e.g., text suggestion region 16A), candidate character string module 64 may maintain context data structure 72 to reflect the selection. For example, candidate character string module 64 may traverse context data structure 72 to determine whether the context of the gesture input, responsive to which candidate character string module 64 determined the plurality of candidate character strings, is included within context data structure 72. In some examples, candidate character string module 64 may determine that the context of the gesture input is not included within context data structure 72. In such examples, candidate character string module 64 may insert within context data structure 72 a representation of each of the context, candidate character string, and the particular text suggestion region within which the candidate character string was displayed while selected. In other examples, candidate character string module 64 may determine that the context of the gesture input is included within context data structure 72. In such examples, candidate character string module 64 may update (e.g., increment) a counter associated with the context to indicate that the candidate character string was again selected while being displayed within the particular text suggestion region. In certain examples, context data structure 72 may not include a counter.

UI module 6 may receive an indication of subsequent gesture input to select one or more keys of graphical keyboard 12. For instance, UI module 6 may receive an indication of gesture input detected at locations 19 and 21 of graphical keyboard 12. In response, UI module 6 may select "T" key 22 (e.g., corresponding to gesture input detected at location 19) and "H" key 24 (e.g., corresponding to gesture input detected at location 21) as selected keys of graphical keyboard 12.

Candidate character string module 64 may determine a plurality of candidate character strings based at least in part on one or more characters associated with the selected keys (e.g., the character "T" associated with "T" key 22 and character "H" associated with "H" key 24). Ordering module 66 may determine a ranked ordering of the plurality of candidate character strings. For example, ordering module 66 may determine ranked ordering 46 of the plurality of candidate character strings 26, 28, 30, and 32. The ranked order may associate each respective candidate character string from the plurality of candidate character strings with a respective rank (e.g., ranks 36, 38, 40, and 42), such that the ranked ordering of the plurality of candidate character strings includes an ordered arrangement of the plurality of candidate character strings based at least in part on the determined probability of each respective candidate character string.

Suggest region association module 68 may associate at least one of the candidate character strings with a text suggestion region based at least in part on a determination, by suggestion region association module 68, that the at least one candidate character string was previously selected while being displayed within a particular text suggestion region. For example, suggestion region association module 68 may traverse the plurality of candidate character strings (e.g., ranked ordering 46) to determine whether a representation of at least one of the plurality of candidate character strings are included within context data structure 72. In some examples, suggestion region association module 68 may determine that a representation of a particular candidate character string from the plurality of candidate character strings is included within context data structure 72. In such examples, suggestion region association module 68 may determine whether the context of the gesture input, responsive to which candidate character string module 64 determined the plurality of candidate character strings (e.g., the context "th" associated with gesture input detected at locations 19 and 21 of graphical keyboard 12) corresponds to the particular candidate character string within context data structure 72. In examples where suggestion region association module 68 determines that the context of the gesture input corresponds to the particular candidate character string, suggestion region association module 68 may associate the particular candidate character string with the particular text suggestion region associated with the particular candidate character string within context data structure 72, and may output the particular candidate character string for display within the particular text suggestion region.

In some examples, suggestion region association module 68 may determine that the context of the gesture input corresponds to the particular candidate character string when suggestion region association module 68 determines that the context of the gesture input matches the context of gesture input as indicated within context data structure 72. For instance, suggestion region may determine that the context of gesture input including the character string "th" matches the context of gesture input including the character string "th" indicated within context data structure 72. In certain examples, suggestion region association module 68 may determine that the context of the gesture input corresponds to the particular candidate character string when the context of the gesture input as compared to the context of gesture input as indicated within context data structure 72 satisfies a threshold. For example, in examples where the context of gesture input is represented as a centroid of a group of pixels corresponding to one or more touch points of the gesture input, suggestion region association module 68 may determine that the context of the gesture input corresponds to the particular candidate character string when each centroid is less than (or equal to) a threshold distance from the corresponding centroid as indicated by the context within context data structure 72.

In this way, suggestion region association module 68 may associate a particular candidate character string with a particular text suggestion region based on a determination, by suggestion region association module 68, that the particular character string was previously selected while being displayed within the particular text suggestion region. In some examples, the association of the particular candidate character string with the particular text suggestion region may not correspond to the ranked ordering of the plurality of candidate character strings with respect to the ranked ordering of the plurality of text suggestion regions. For instance, suggestion region association module 68 may determine that a rank of particular candidate character string (e.g., candidate character string 26), as determined based on the probability of the particular candidate character string within the plurality of candidate character strings, corresponds to a first text suggestion region (e.g., text suggestion region 16B). Rather than output the particular candidate character string for display within the first text suggestion region (e.g., text suggestion region 16B), suggestion region association module 68 may output the particular candidate character string (e.g., candidate character string 26) for display within a second text suggestion region (e.g., text suggestion region 16A) based on a determination that the particular candidate character string was previously selected while being displayed within the second text suggestion region.

In this way, suggestion region association module 68 may, in certain examples, override techniques of outputting candidate character strings for display within text suggestion regions in accordance with a correspondence between a probability of each of the plurality of candidate character strings and a rank of each of the plurality of text suggestion regions. Rather, in some examples, suggestion region association module 68 may output a particular candidate character string for display within a particular text suggestion region based at least in part on a determination that the particular candidate character string was previously selected while being displayed within the particular text suggestion region. Accordingly, computing device 2 may enable a user to predict within which of the plurality of text suggestion regions the particular candidate character string will be displayed, thereby possibly enabling the user to select the particular candidate character string from the particular text suggestion region without attending to others of the text suggestion regions. In this way, techniques described herein may enable a user to develop a set of skills that allows the user to utilize the suggestion interface as a natural extension of the keyboard. That is, because the techniques may enable a user to predict that a particular sequence of keys will yield a particular suggestion in a particular location, the techniques may enable the user to enter those keys and select the suggestion without attending to the other presented suggestions. Moreover, the techniques may help improve a user's confidence in the suggestion system to produce useful results, thereby encouraging the user to utilize the suggestion system as a text input accelerator. In this way, according to techniques described herein, computing device 2 may increase the rate at which the user may enter text, thereby increasing usability of computing device 2.

Figure 3:
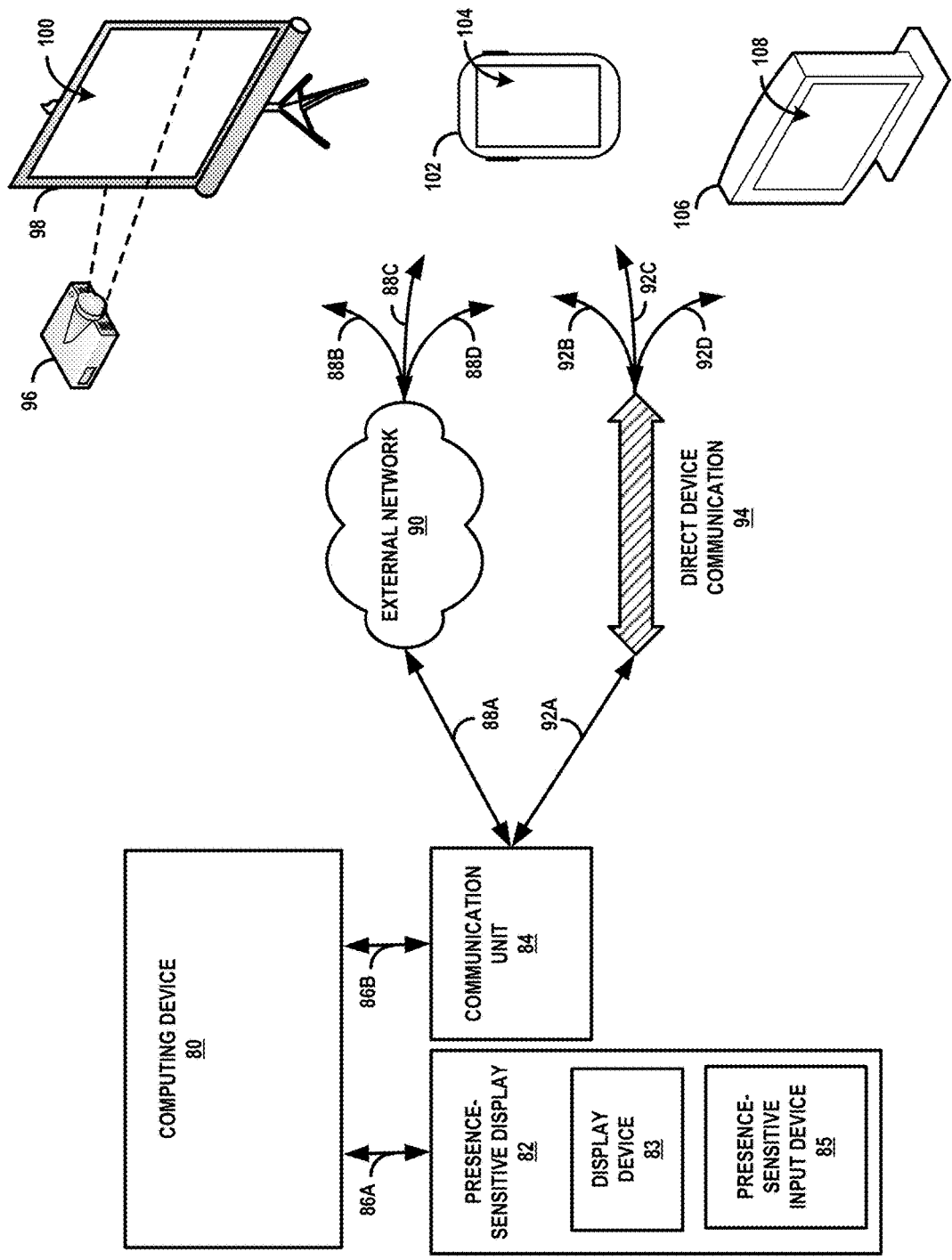
FIG. 3 is a block diagram illustrating an example computing device that outputs graphical content for display at a remote device, in accordance with one or more aspects of this disclosure.

FIG. 3 is a block diagram illustrating an example computing device that outputs graphical content for display at a remote device, in accordance with one or more aspects of this disclosure. Graphical content, generally, may include any visual information that may be output for display, such as text, images, a group of moving images, etc. The example shown in FIG. 3 includes a computing device 80, presence-sensitive display 82, communication unit 84, projector 96, projector screen 98, tablet device 102, and visual display device 106. Although shown for purposes of example in FIGS. 1 and 2 as a stand-alone computing device 80, a computing device may, generally, be any component or system that includes a processor or other suitable computing environment for executing software instructions and, for example, need not include a presence-sensitive display.

As shown in the example of FIG. 3, computing device 80 may be a processor that includes functionality as described with respect to processor 50 in FIG. 2. In such examples, computing device 80 may be operatively coupled to presence-sensitive display 82 by a communication channel 86A, which may be a system bus or other suitable connection. Computing device 80 may also be operatively coupled to communication unit 84, further described below, by a communication channel 86B, which may also be a system bus or other suitable connection. Although shown separately as an example in FIG. 3, computing device 80 may be operatively coupled to presence-sensitive display 82 and I/O devices 84 by any number of one or more communication channels.

In other examples, such as illustrated previously in FIGS. 1-2, computing device 80 may refer to a portable or mobile device such as mobile phones (including smart phones), laptop computers, etc. In some examples, computing device 80 may be a desktop computers, tablet computers, smart television platforms, cameras, personal digital assistants (PDAs), servers, mainframes, etc.

Presence-sensitive display 82, like UI device 4 as shown in FIG. 1, may include display device 83 and presence-sensitive input device 85. Display device 83 may, for example, receive data from computing device 80 and display the graphical content. In some examples, presence-sensitive input device 85 may determine one or more user inputs (e.g., continuous gestures, multi-touch gestures, single-touch gestures, etc.) at presence-sensitive display 82 using capacitive, inductive, and/or optical recognition techniques and send indications of such user input to computing device 80 using communication channel 86A. In some examples, presence-sensitive input device 85 may be physically positioned on top of display device 83 such that, when a user positions an input unit over a graphical element displayed by display device 83, the location at which presence-sensitive input device 85 corresponds to the location of display device 83 at which the graphical element is displayed.

As shown in FIG. 3, computing device 80 may also include and/or be operatively coupled with communication unit 84. Communication unit 84 may include functionality of communication unit 54 as described in FIG. 2. Examples of communication unit 84 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 80 may also include and/or be operatively coupled with one or more other devices, e.g., input devices, output devices, memory, storage devices, etc. that are not shown in FIG. 3 for purposes of brevity and illustration.

FIG. 3 also illustrates a projector 96 and projector screen 98. Other such examples of projection devices may include electronic whiteboards, holographic display devices, and any other suitable devices for displaying graphical content. Projector 96 and project screen 98 may include one or more communication units that enable the respective devices to communicate with computing device 80. In some examples, the one or more communication units may enable communication between projector 96 and projector screen 98. Projector 96 may receive data from computing device 80 that includes graphical content. Projector 96, in response to receiving the data, may project the graphical content onto projector screen 98. In some examples, projector 96 may determine one or more user inputs (e.g., continuous gestures, multi-touch gestures, single-touch gestures, etc.) at projector screen using optical recognition or other suitable techniques and send indications of such user input using one or more communication units to computing device 80.

Projector screen 98, in some examples, may include a presence-sensitive display 100. Presence-sensitive display 100 may include a subset of functionality or all of the functionality of UI device 4 as described in this disclosure. In some examples, presence-sensitive display 100 may include additional functionality. Projector screen 98 (e.g., an electronic whiteboard), may receive data from computing device 80 and display the graphical content. In some examples, presence-sensitive display 100 may determine one or more user inputs (e.g., continuous gestures, multi-touch gestures, single-touch gestures, etc.) at projector screen 98 using capacitive, inductive, and/or optical recognition techniques and send indications of such user input using one or more communication units to computing device 80.

FIG. 3 also illustrates tablet device 102 and visual display device 106. Tablet device 102 and visual display device 106 may each include computing and connectivity capabilities. Examples of tablet device 102 may include e-reader devices, convertible notebook devices, hybrid slate devices, etc. Examples of visual display device 106 may include televisions, computer monitors, etc. As shown in FIG. 3, tablet device 102 may include a presence-sensitive display 104. Visual display device 106 may include a presence-sensitive display 108. Presence-sensitive displays 104, 108 may include a subset of functionality or all of the functionality of UI device 4 as described in this disclosure. In some examples, presence-sensitive displays 104, 108 may include additional functionality. In any case, presence-sensitive display 108, for example, may receive data from computing device 80 and display the graphical content. In some examples, presence-sensitive display 108 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 80.

As described above, in some examples, computing device 80 may output graphical content for display at presence-sensitive display 82 that is coupled to computing device 80 by a system bus or other suitable communication channel. Computing device 80 may also output graphical content for display at one or more remote devices, such as projector 96, projector screen 98, tablet device 102, and visual display device 106. For instance, computing device 80 may execute one or more instructions to generate and/or modify graphical content in accordance with techniques of the present disclosure. Computing device 80 may output the data that includes the graphical content to a communication unit of computing device 80, such as communication unit 84. Communication unit 84 may send the data to one or more of the remote devices, such as projector 96, projector screen 98, tablet device 102, and/or visual display device 106. In this way, processor 102 may output the graphical content for display at one or more of the remote devices. In some examples, one or more of the remote devices may output the graphical content at a presence-sensitive display that is included in and/or operatively coupled to the respective remote devices.

In some examples, computing device 80 may not output graphical content at presence-sensitive display 82 that is operatively coupled to computing device 80. In other examples, computing device 80 may output graphical content for display at both a presence-sensitive display 82 that is coupled to computing device 80 by communication channel 86A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 80 and output for display at presence-sensitive display 82 may be different than graphical content display output for display at one or more remote devices.

Computing device 80 may send and receive data using any suitable communication techniques. For example, computing device 80 may be operatively coupled to external network 90 using network link 88A. Each of the remote devices illustrated in FIG. 3 may be operatively coupled to network external network 90 by one of respective network links 88B, 88C, and 88D. External network 90 may include network hubs, network switches, network routers, etc., that are operatively inter-coupled thereby providing for the exchange of information between computing device 80 and the remote devices illustrated in FIG. 3. In some examples, network links 88A-88D may be Ethernet, ATM or other network connections. Such connections may be wireless and/or wired connections.

In some examples, computing device 80 may be operatively coupled to one or more of the remote devices included in FIG. 3 using direct device communication 94. Direct device communication 94 may include communications through which computing device 80 sends and receives data directly with a remote device, using wired or wireless communication. That is, in some examples of direct device communication 94, data sent by computing device 80 may not be forwarded by one or more additional devices before being received at the remote device, and vice-versa. Examples of direct device communication 94 may include Bluetooth, Near-Field Communication, Universal Serial Bus, WiFi, infrared, etc. One or more of the remote devices illustrated in FIG. 3 may be operatively coupled with computing device 80 by communication links 92A-92D. In some examples, communication links 88A-88D may be connections using Bluetooth, Near-Field Communication, Universal Serial Bus, infrared, etc. Such connections may be wireless and/or wired connections.

In accordance with techniques of the disclosure, computing device 80 may be operatively coupled to visual display device 106 using external network 90. Computing device 80 may output a graphical user interface including, for example, a graphical keyboard and a plurality of text suggestion regions for display at presence-sensitive display 108. For instance, computing device 80 may send data that includes a representation of the graphical user interface to communication unit 84. Communication unit 84 may send the data that includes the representation of the graphical user interface to visual display device 106 using external network 90. Visual display device 106, in response to receiving the data using external network 90, may cause presence-sensitive display 108 to output the graphical user interface. In response to a user performing a gesture at presence-sensitive display 108 to select one or more keys of the keyboard, visual display device 106 may send an indication of the gesture input to computing device 80 using external network 90. Communication unit 84 may receive the indication of the gesture, and send the indication to computing device 80.

Computing device 80 may select, based at least in part on the indication of the gesture input, a candidate character string from a plurality of candidate character strings. In some examples, computing device 80 determine that the candidate character string was previously selected while being displayed within a particular text suggestion region from the plurality of text suggestion regions of the graphical user interface. Computing device 80 may output, based at least in part on determining that the candidate character string was previously selected while being displayed within the particular text suggestion region, the candidate character string for display at visual display device 106. For instance, computing device 80 may send data that includes the candidate character string and an indication of the particular text suggestion region to communication unit 84, which in turn sends the data to visual display device 106 using external network 90. Upon receiving the data, visual display device 106 may cause presence-sensitive display 108 to display the candidate character string within the particular text suggestion region of the graphical user interface. In this way, processor 102 may output the candidate character string for display at presence-sensitive screen 108, in accordance with techniques of this disclosure.

Figure 4:
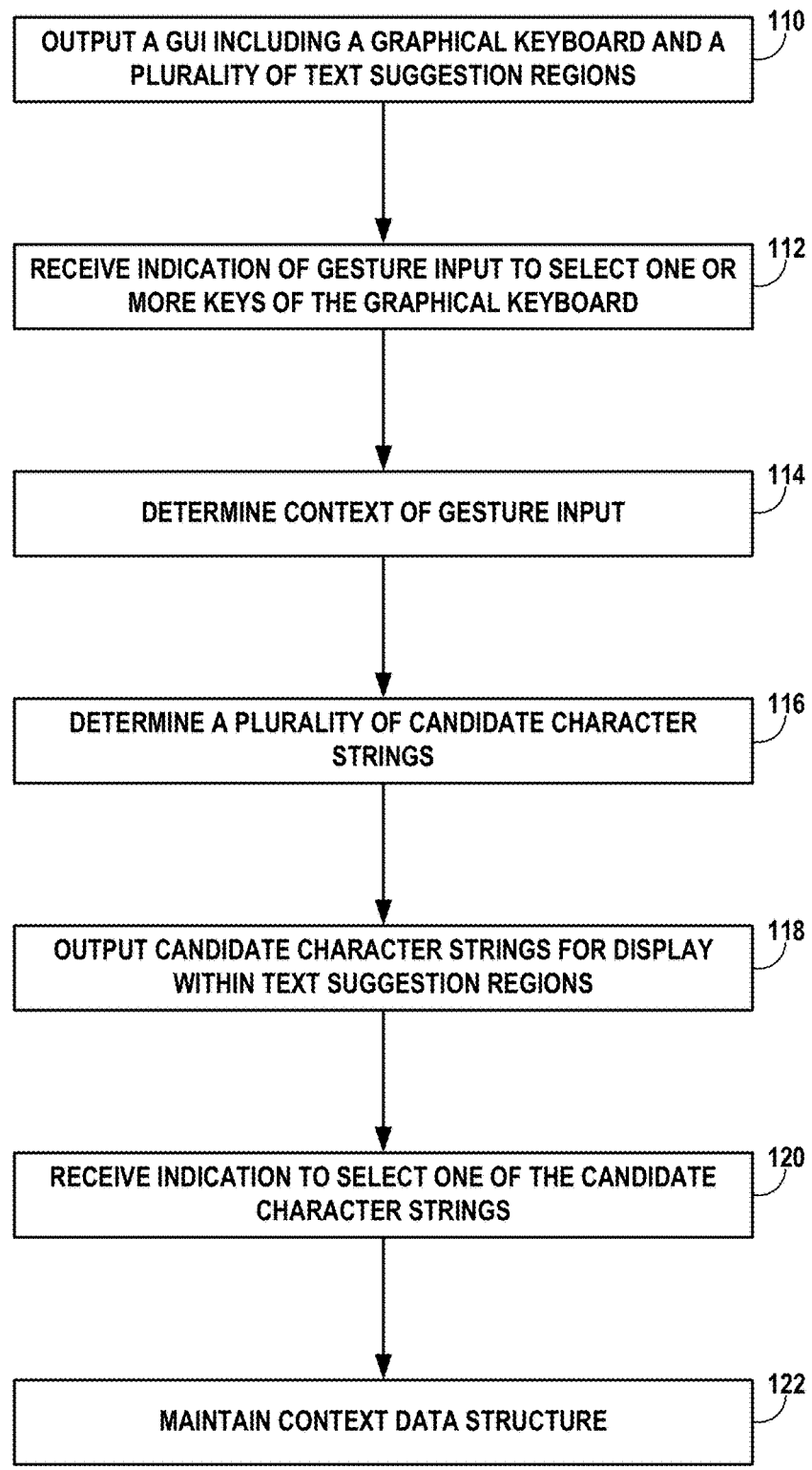
FIG. 4 is a flow diagram illustrating example operations of a computing device that may be used to output a candidate character string within a particular text suggestion region, in accordance with one or more aspects of this disclosure.

FIG. 4 is a flow diagram illustrating example operations of a computing device that may be used to output a candidate character string within a particular text suggestion region, in accordance with one or more aspects of this disclosure. For purposes of illustration only, the example operations are described below within the context of computing device 2, as shown in FIGS. 1 and 2.

Computing device 2 may output, for display, a graphical user interface including a graphical keyboard and a plurality of text suggestion regions (110). For example, UI module 6, executing on one or more processors 50 of computing device 2, may output, for display at UI device 4 (e.g., a presence-sensitive and/or touch-sensitive display), GUI 10A including graphical keyboard 12 and text suggestion regions 16. Computing device 2 may receive an indication of gesture input detected at a presence-sensitive display to select one or more keys of the graphical keyboard (112). For instance, UI module 6 may receive an indication of gesture input detected at locations 18 and 20 of graphical keyboard 12. In response, UI module 6 may select "T" key 22 (e.g., corresponding to the indication of gesture input detected at location 18) and "H" key 24 (e.g., corresponding to the indication of gesture input detected at location 20).

Computing device 2 may determine a context of the received gesture input (114). For instance, candidate character string module 64, executing on one or more processors 50, may determine a context of the indication of the received gesture input. As an example, the context may include an indication of one or more selected keys of graphical keyboard 12 (e.g., "T" key 22 and "H" key 24), an indication of one or more characters associated with the one or more selected keys of graphical keyboard 12 (e.g., character "T" associated with "T" key 22 and character "H" associated with "H" key 24), an indication of one or more locations of UI device 4 corresponding to the received gesture input (e.g., a centroid of a group of pixels corresponding to touch inputs detected at locations 18 and 20), and the like.

Computing device 2 may determine a plurality of candidate character strings based at least in part on the received indication of the gesture input (116). For example, candidate character string module 66 may access language model 70 to determine a plurality of candidate words included in a lexicon (e.g., the English language) for which the one or more characters associated with the received gesture input are a prefix. For instance, candidate character string module 66 may determine the plurality of candidate character strings 26 (i.e., the character string "this"), 28 (i.e., the character string "the"), 30 (i.e., the character string "that"), and 32 (i.e., the character string "than") for which the character string "th", associated with selected keys 22 and 24, are a prefix.

Computing device 2 may output one or more of the plurality of candidate character strings for display within the plurality of text suggestion regions (118). For instance, in some examples, ordering module 66, executing on one or more processors 50, may determine a ranked ordering of the plurality of candidate character strings. Ordering module 66 may determine the ranked ordering based at least in part on a probability of each respective candidate character string from the plurality of candidate character strings, such as by comparing each respective candidate character string with language model 70 to determine the respective probability. In certain examples, suggestion region association module 68 may associate one or more of the plurality of candidate character strings with the plurality of text suggestion regions based on a correspondence between a rank associated with a respective candidate character string and a rank associated with a particular text suggestion region. For instance, suggestion region association module 68 may associate candidate character string 26 with text suggestion region 16A based on a correspondence between rank 36 associated with candidate character string 26 within ranked ordering 34 and a rank associated with text suggestion region 16A within a ranked ordering of text suggestion regions 16 (e.g., a highest rank within the ranked ordering of text suggestion regions 16). Similarly, suggestion region association module 68 may associate candidate character string 28 with text suggestion region 16B and candidate character string 30 with text suggestion region 16C. Suggestion region association module 68 may output a set of the plurality of candidate character strings (e.g., the set of candidate character strings including candidate character strings 26, 28, and 30) for display within text suggestion regions 16 in accordance with the associations.

Computing device 2 may receive an indication to select one of the candidate character strings (120). For example, UI module 6 may receive an indication of gesture input detected at location 44 to select candidate character string 26 displayed within text suggestion region 16A. Computing device 2 may maintain a data structure to associate the context of the gesture input, the candidate character string, and the text suggestion region within which the candidate character string was displayed while computing device 2 received the indication of gesture input to select the candidate character string (122). For instance, suggestion region association module 68 may update context data structure 72 to associate the context of gesture input "th", text suggestion region 16A, and candidate character string 26.

Figure 5:
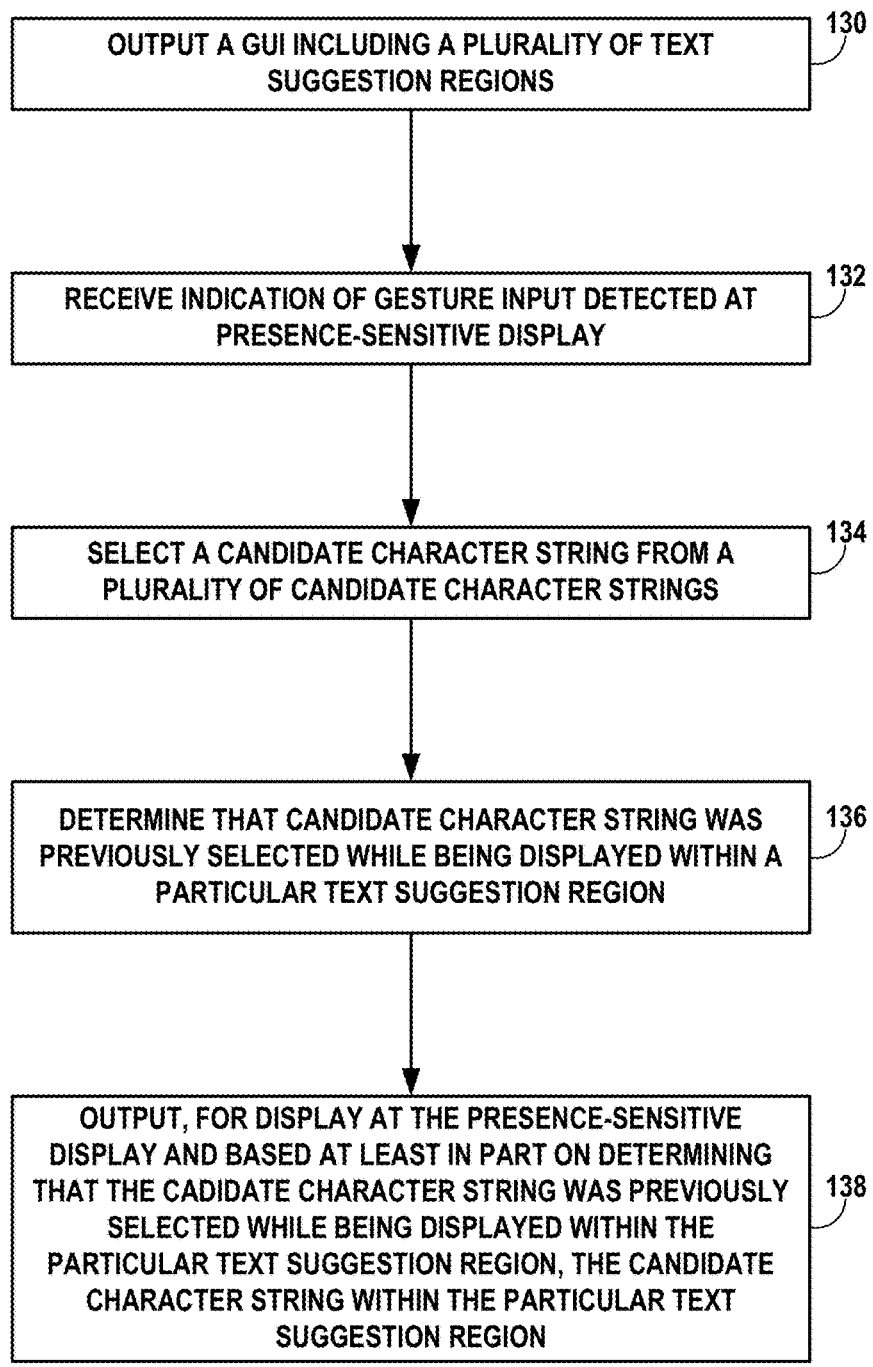
FIG. 5 is a flow diagram illustrating example operations of a computing device that may be used to output a candidate character string within a particular text suggestion region, in accordance with one or more aspects of this disclosure.

FIG. 5 is a flow diagram illustrating example operations of a computing device that may be used to output a candidate character string within a particular text suggestion region, in accordance with one or more aspects of this disclosure. For purposes of illustration only, the example operations are described below within the context of computing device 2, as shown in FIGS. 1 and 2.

Computing device 2 may output, for display, a graphical user interface including a plurality of text suggestion regions (130). For instance, UI module 6 may output, for display at UI device 4 (e.g., a presence-sensitive display), GUI 10B including the plurality of text suggestion regions 16. Computing device 2 may receive an indication of gesture input detected at a presence-sensitive input device (132). For example, UI module 6 may receive an indication of gesture input detected at locations 19 and 21 of UI device 4. Computing device 2 may select, based at least in part on the indication of the gesture input, a candidate character string from a plurality of candidate character strings (134). For instance, candidate character string module 64 may access language model 70 to determine a plurality of candidate words included in a lexicon for which one or more characters associated with the gesture input are a prefix. In some examples, candidate character string module 64 may traverse the plurality of candidate character strings and may select one of the plurality of candidate character strings.

Computing device 2 may determine that the candidate character string was previously selected while being displayed within a particular text suggestion region from the plurality of text suggestion regions (136). For example, suggestion region association module 68 may traverse context data structure 72 to determine whether context data structure 72 associates the candidate character string with a context of the gesture input and a particular text suggestion region from the plurality of text suggestion regions. In certain examples, suggestion region association module 68 may determine that the candidate character string was previously selected while being displayed within a particular text suggestion region in response to determining that context data structure 72 associates the candidate character string with a context of the gesture input and a particular text suggestion region. When suggestion region association module 68 determines that the candidate character string was previously selected while being displayed within a particular text suggestion region, suggestion region association module 68 may output the candidate character string for display within the particular text suggestion region.

In one example, the candidate character string is a first candidate character string from the plurality of candidate character strings, the particular text suggestion region is a first text suggestion region from the plurality of text suggestion regions, and the operations further comprise determining, by computing device 2 and based at least in part on a probability of each respective candidate character string from the plurality of candidate character strings, a ranked ordering of the plurality of candidate character strings, determining, by computing device 2 and based at least in part on the ranked ordering of the plurality of candidate character strings, that a second candidate character string from the plurality of candidate character strings is associated with the first text suggestion region and the first candidate character string is associated with a second text suggestion region from the plurality of text suggestion regions, and associating, by computing device 2 and based at least in part on determining that the first candidate character string was previously selected while being displayed within the first text suggestion region, the first candidate character string with the first text suggestion region.

In one example, the plurality of text suggestion regions comprises a ranked ordering of the plurality of text suggestion regions, the first text suggestion region is associated with a first rank within the ranked ordering of the plurality of text suggestion regions, the second text suggestion region is associated with a second rank within the ranked ordering of the plurality of text suggestion regions, and determining that the second candidate character string is associated with the first text suggestion region and the first candidate character string is associated with the second text suggestion region further comprises determining, by computing device 2, that the second candidate character string is associated with a first rank within the ranked ordering of the plurality of candidate character strings that matches the first rank within the ranked ordering of the plurality of text suggestion regions, and determining, by computing device 2, that the second candidate character string is associated with a first rank within the ranked ordering of the plurality of candidate character strings that matches the first rank within the ranked ordering of the plurality of text suggestion regions.

In one example, determining, by computing device 2 and based at least in part on the probability of each respective candidate character string from the plurality of candidate character strings, the ranked ordering of the plurality of candidate character strings further comprises comparing, by computing device 2, each respective candidate character string from the plurality of candidate character strings with a language model to determine a probability that the respective candidate character string represents a word included in a lexicon. In one example, the language model comprises an n-gram language model.

In one example, receiving the indication of the gesture input comprises receiving an indication of first gesture input, and the operations further comprise receiving, by computing device 2, an indication of second gesture input detected at the presence-sensitive input device prior to detection of the first gesture input, determining, by computing device 2 and based at least in part on the indication of the second gesture input, a context of the second gesture input, outputting, by computing device 2, for display, and based at least in part on the indication of the second gesture input, the candidate character string within the particular text suggestion region, receiving, by computing device 2, an indication of third gesture input detected at the presence-sensitive input device prior to detection of the first gesture input, and determining, by computing device 2 and based at least in part on the indication of the third gesture input, that the candidate character string was selected while being displayed within the particular text suggestion region.

In one example, the operations further comprise selecting, by computing device 2 and based at least in part on the second gesture input, at least one key of a graphical keyboard, wherein determining the context of the second gesture input comprises determining at least one character associated with the at least one selected key of the graphical keyboard. In one example, the at least one character associated with the at least one selected key of the graphical keyboard is associated with at least one character of the candidate character string. In one example, determining the context of the second gesture input comprises determining at least one location of the presence-sensitive input device that is associated with the second gesture input.

In one example, the operations further comprise generating, by computing device 2, a data structure that associates the context of the second gesture input with the candidate character string. In one example, generating the data structure that associates the context of the second gesture input with the candidate character string further comprises generating the data structure that associates the context of the second gesture input with the particular text suggestion region. In one example, the operations further comprise storing, by computing device 2, the data structure at a computer-readable storage medium of the computing device. In one example, determining that the candidate character string was selected while being displayed within the particular text suggestion region further comprises determining, by computing device 2, that the third gesture input was detected at a location of the presence-sensitive input device associated with the particular text suggestion region.

In one example, determining that the candidate character string was selected while being displayed within the particular text suggestion region further comprises determining, by computing device 2, that the third gesture input was detected at a location of a graphical keyboard associated with a delimiter key of the graphical keyboard. In one example, the operations further comprise determining, by computing device 2, that a context of the gesture input matches a context associated with the candidate character string, wherein outputting the candidate character string for display within the particular text suggestion region further comprises outputting, based at least in part on the determining that the context of the gesture input matches the context associated with the candidate character string, the candidate character string for display within the particular text suggestion region.

In one example, the operations further comprise outputting, by computing device 2 and for display, a graphical keyboard comprising a plurality of keys, selecting, by computing device 2 and based at least in part on the gesture input, at least one key of the graphical keyboard, and determining that the context of the gesture input matches the context associated with the candidate character string further comprises determining, by computing device 2, that at least one character associated with the at least one selected key of the graphical keyboard matches at least one character included in the context associated with the candidate character string.

In one example, receiving the indication of the gesture input detected at the presence-sensitive input device comprises receiving, by computing device 2, an indication of a first touch input detected at the presence-sensitive input device to select a first key of a graphical keyboard, and receiving, by computing device 2, an indication of a second touch input detected at the presence-sensitive input device to select a second key of the graphical keyboard. In one example, receiving the indication of the gesture input detected at the presence-sensitive input device comprises receiving, by computing device 2, an indication of a continuous motion gesture detected at the presence-sensitive input device to select a group of keys of a graphical keyboard, wherein the continuous motion gesture comprises motion of an input unit from a first location of the presence-sensitive input device to a second location of the presence-sensitive input device, and wherein the presence-sensitive input device detects the presence of the input unit from the first location to the second location.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   determining, by a computing device, based on a first input at a graphical keyboard, a plurality of candidate strings and an initial ranked ordering of the plurality of candidate character strings, wherein a first candidate character string from the plurality of candidate character strings is associated with a highest rank of the initial ranked ordering of the plurality of candidate character strings and a second candidate character string from the plurality of candidate character strings is associated with a second-highest rank of the initial ranked ordering of the plurality of candidate character strings;

outputting, by the computing device and for display, based on the initial ranked ordering of the plurality of candidate character strings, the first candidate character string in a first text suggestion region from a plurality of text suggestion regions and the second candidate character string in a second text suggestion region from the plurality of text suggestion regions, the first text suggestion region being associated with a highest rank of a ranked ordering of the plurality of text suggestion regions and the second text suggestion region being associated with a second-highest rank of the ranked ordering of the plurality of text suggestion regions;

receiving, by the computing device, a second input that selects the first candidate character string from the first text suggestion region;

determining, by the computing device, based on a third input at the graphical keyboard, the plurality of candidate strings and a subsequent ranked ordering of the plurality of candidate character strings, the first candidate character string being associated with a second-highest rank of the subsequent ranked ordering of the plurality of candidate character strings and the second candidate character string being associated with a highest rank of the subsequent ranked ordering of the plurality of candidate character strings;

associating, by the computing device, based on the subsequent ranked ordering of the plurality of candidate character strings, the first candidate character string with the second text suggestion region; and responsive to determining that the first candidate character string was previously selected from the first text suggestion region when the first candidate character string was previously displayed, outputting, by the computing device for display, the first candidate character string in the first text suggestion region.

2. The method of claim 1, wherein determining the initial ranked ordering of the plurality of candidate character strings further comprises comparing, by the computing device, each respective candidate character string from the plurality of candidate character strings with a language model to determine a probability that the respective candidate character string represents a word included in a lexicon.

3. The method of claim 2 wherein the language model comprises an n-gram language model.

4. The method of claim 1, further comprising:
determining, by the computing device, that a context of the third input matches a context associated with the first candidate character string, wherein outputting the first candidate character string for display in the first text suggestion region further comprises outputting, based at least in part on the determining that the context of the third input matches the context associated with the first candidate character string, the first candidate character string for display within the first text suggestion region.

5. The method of claim 1, wherein receiving the second input comprises:
receiving, by the computing device, an indication of a touch input detected at a presence-sensitive input device to select the first text suggestion region.

6. A non-transitory computer-readable storage medium comprising instructions that, when executed, cause at least one processor to:

determine, based on a first input at a graphical keyboard, a plurality of candidate strings and an initial ranked ordering of the plurality of candidate character strings, wherein a first candidate character string from the plurality of candidate character strings is associated with a highest rank of the initial ranked ordering of the plurality of candidate character strings and a second candidate character string from the plurality of candidate character strings is associated with a second-highest rank of the initial ranked ordering of the plurality of candidate character strings;

output, for display, based on the initial ranked ordering of the plurality of candidate character strings, the first candidate character string in a first text suggestion region from a plurality of text suggestion regions and the second candidate character string in a second text suggestion region from the plurality of text suggestion regions, the first text suggestion region being associated with a highest rank of a ranked ordering of the plurality of text suggestion regions and the second text suggestion region being associated with a second-highest rank of the ranked ordering of the plurality of text suggestion regions;

receive a second input that selects the first candidate character string from the first text suggestion region;

determine, based on a third input at the graphical keyboard, the plurality of candidate strings and a subsequent ranked ordering of the plurality of candidate character strings, the first candidate character string being associated with a second-highest rank of the subsequent ranked ordering of the plurality of candidate character strings and the second candidate character string being associated with a highest rank of the subsequent ranked ordering of the plurality of candidate character strings;

associate, based on the subsequent ranked ordering of the plurality of candidate character strings, the first candidate character string with the second text suggestion region; and responsive to determining that the first candidate character string was previously selected from the first text suggestion region when the first candidate character string was previously displayed, output, for display, the first candidate character string in the first text suggestion region.

7. The non-transitory computer-readable storage medium of claim 6, wherein the instructions, when executed, cause the at least one processor to determine the initial ranked ordering of the plurality of candidate character strings by comparing, by the computing device, each respective candidate character string from the plurality of candidate character strings with a language model to determine a probability that the respective candidate character string represents a word included in a lexicon.

8. The non-transitory computer-readable storage medium of claim 6, wherein the instructions, when executed, cause the at least one processor to output the first candidate character string for display in the first text suggestion region based at least in part on determining that a context of the third input matches a context associated with the first candidate character string.

9. The non-transitory computer-readable storage medium of claim 6, wherein the instructions, when executed, cause the at least one processor to receive the third input by receiving an indication of a touch input detected at a presence-sensitive input device to select the first text suggestion region.

10. A computing device of comprising:

at least one processor; and a memory comprising instructions that, when executed, cause the at least one processor to:

determine, based on a first input at a graphical keyboard, a first plurality of candidate strings and an initial ranked ordering of the first plurality of candidate character strings, wherein a particular candidate character string from the first plurality of candidate character strings is associated with a highest rank of the initial ranked ordering of the first plurality of candidate character strings;

output, for display, based on the initial ranked ordering of the first plurality of candidate character strings, the particular candidate character string in a first text suggestion region from a plurality of text suggestion regions, the first text suggestion region being associated with a highest rank of a ranked ordering of the plurality of text suggestion regions and the second text suggestion region being associated with a second-highest rank of the ranked ordering of the plurality of text suggestion regions;

receive a second input that selects the particular candidate character string from the first text suggestion region;

determine, based on a third input at the graphical keyboard, a second plurality of candidate strings and a subsequent ranked ordering of the second plurality of candidate character strings, the second plurality of candidate character strings including the particular candidate character string, the particular candidate character string being associated with a second-highest rank of the subsequent ranked ordering of the second plurality of candidate character strings;

associate, based on the subsequent ranked ordering of the second plurality of candidate character strings, the particular candidate character string with the second text suggestion region; and responsive to determining that the particular candidate character string was previously selected from the first text suggestion region when the particular candidate character string was previously displayed, output, for display, the particular candidate character string in the first text suggestion region.

11. The computing device of claim 10, wherein the instructions, when executed, further cause the at least one processor to determine the initial ranked ordering of the first plurality of candidate character strings by comparing, by the computing device, each respective candidate character string from the first plurality of candidate character strings with a language model to determine a probability that the respective candidate character string represents a word included in a lexicon.

12. The computing device of claim 10, wherein the instructions, when executed, further cause the at least one processor to output the particular candidate character string for display in the first text suggestion region based at least in part on determining that a context of the third input matches a context associated with the particular candidate character string.

13. The computing device of claim 10, wherein the instructions, when executed, further cause the at least one processor to receive the third input by receiving an indication of a touch input detected at a presence-sensitive input device to select the first text suggestion region.

* * * * *